March 22, 1955     C. H. THAYER     2,704,741
METHOD AND APPARATUS FOR CONVERSION OF ORGANIC
REACTANTS TO OTHER ORGANIC PRODUCTS
Filed Sept. 14, 1953     7 Sheets-Sheet 1

INVENTOR.
CLARENCE H. THAYER
BY
ATTORNEY

March 22, 1955  C. H. THAYER  2,704,741
METHOD AND APPARATUS FOR CONVERSION OF ORGANIC
REACTANTS TO OTHER ORGANIC PRODUCTS
Filed Sept. 14, 1953  7 Sheets-Sheet 3
Fig. 3
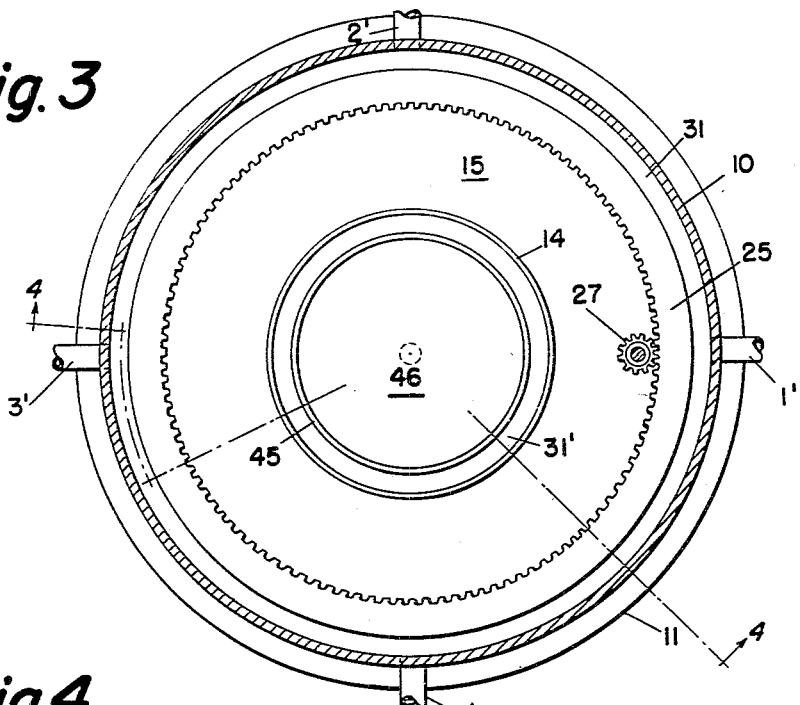
Fig. 4
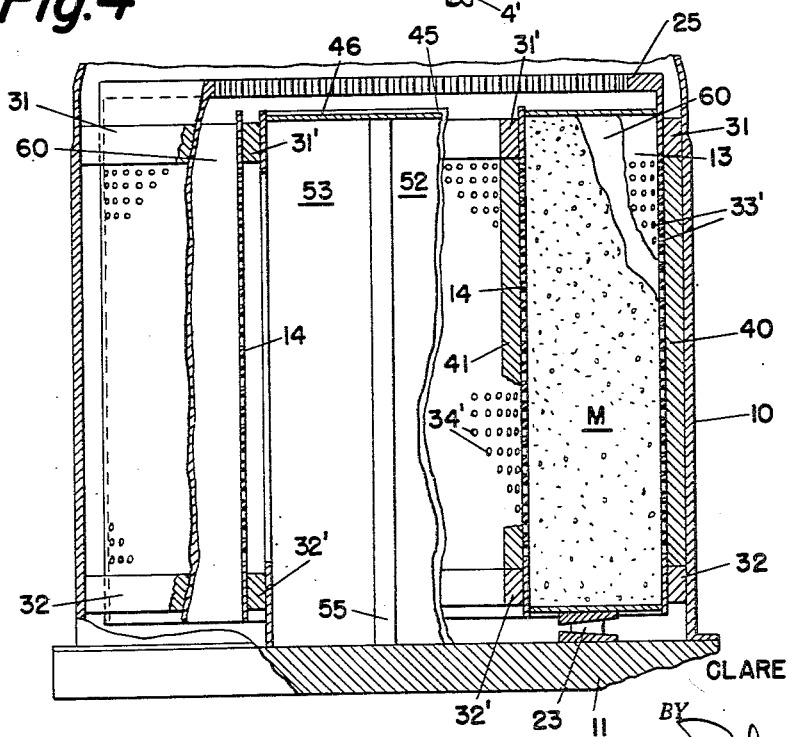
INVENTOR.
CLARENCE H. THAYER
BY
ATTORNEY

INVENTOR.
CLARENCE H. THAYER

March 22, 1955 C. H. THAYER 2,704,741
METHOD AND APPARATUS FOR CONVERSION OF ORGANIC
REACTANTS TO OTHER ORGANIC PRODUCTS
Filed Sept. 14, 1953 7 Sheets-Sheet 6

INVENTOR.
CLARENCE H. THAYER
BY
ATTORNEY

INVENTOR.
CLARENCE H. THAYER

United States Patent Office 2,704,741
Patented Mar. 22, 1955

2,704,741

METHOD AND APPARATUS FOR CONVERSION OF ORGANIC REACTANTS TO OTHER ORGANIC PRODUCTS

Clarence H. Thayer, Wallingford, Pa., assignor to Sun Oil Company, Philadelphia, Pa., a corporation of New Jersey Application September 14, 1953, Serial No. 380,027

21 Claims. (Cl. 196—52)

This invention relates to the art of converting fluid organic reactants to other fluid organic products by contact with a catalyst and alternately with which the catalyst by contact with other fluids is regenerated for contact with later supplies of organic reactants.

This art is especially applicable, although not limited, to the conversion of fluid hydrocarbon reactants to other fluid hydrocarbons, wherein, after catalytic conversion of a hydrocarbon reactant to other hydrocarbons, the catalyst is purged by a suitable fluid, then regenerated by a suitable reactant, and again purged by a suitable fluid, thus completing the cycle and reconditioning the catalyst for conversion of fluid hydrocarbons to other fluid hydrocarbons. In this process regeneration of the catalyst is required to remove from the catalyst particles the carbonaceous deposit which accumulates thereon during the hydrocarbon conversion step, this being effected by an oxidizing agent such as air; the purging steps, in which the purging fluid may be steam, removing from the catalyst particles any reactant or products that may adhere thereto in the preceding hydrocarbon conversion and regenerating steps.

This process as broadly above described has been widely and successfully used commercially for many years, it being practiced in what are known as the fixed bed process, the moving bed process, and the fluid catalyst process, which are so well known as to require no description.

Other embodiments of the process have been devised but, so far as I know, have not gone into commercial use. In one such process a rotatable cylindrical catalyst carrier divided into compartments is arranged between upper and lower hollow heads annular in form and divided into compartments annular in form, the reactants and purging fluids each flowing from compartments in the upper annular head successively through the catalyst compartments in a direction parallel to the axis of rotation of the cylindrical catalyst carrier, into a corresponding compartment in the lower annular head.

The object of the invention is to provide a process which, when applied to any process for converting fluid organic reactants to other organic products, and particularly when applied to the conversion of hydrocarbons to other hydrocarbons, will effect a more efficient and economical operation as compared with known processes, such as hereinbefore mentioned. My invention accomplishes this object by effecting a maximum conversion of organic products with a minimum quantity of catalyst, by utilizing the catalyst to effect conversion only when its activity is at a maximum, by prolonging the life of the catalyst, and by providing a converter of such simplified construction that the yield in converted products in relation to capital cost will substantially exceed that of known converters. This saving in capital cost, together with the smaller cost of the catalyst required to secure a given yield of products, afford opportunity for the smaller refiner to compete, on even terms, with the larger refiners operating existing commercial catalytic plants practicing the same generic process.

Characteristic features of the invention, as expressed in terms of process, involve the provision of a rotatable annular catalytic mass divided into a multiplicity of radial sections; continuously flowing, as the revolution of the catalyst mass proceeds, the several fluids outward from a central space into fixed circumferentially aligning arcuate spaces corresponding in number to the fluids and sealed one from another, such arcuate spaces being surrounded by the revoluble annular catalytic mass; and continuously flowing, as the revolution of the annular catalyst mass continues, the fluids from each sealed arcuate space outward through successive fractions of the mass into fixed circumferential aligning arcuate spaces surrounding the catalyst mass and paired with the first named arcuate spaces; and removing the fluid products of the several fluid contacting operations separately from the outer arcuate spaces.

To practice this process I provide a converter comprising a fixed outer cylindrical casing, a fixed inner cylindrical casing, and an annular revoluble reaction vessel between the inner and outer casings and spaced from both to form inner and outer circumferential spaces. Partitions in the inner casing divide it into contours preferably of sector shape. Vertically and circumferentially extending seals between the annular rotatable vessel and the inner casing divide the inner circumferential space into independent aligning arcuate spaces communicating with the respective sectors. Other vertically and circumferentially extending seals divide the outer circumferential space into independent aligning arcuate spaces paired with the inner independent arcuate spaces. The reaction vessel is divided into a multitude of approximately radially-extending compartments adapted to contain the catalyst, the compartments having inner inlets and outer outlets which, in the rotation of the reaction vessel, afford communication between successive pairs of inner and outer arcuate spaces.

In the drawings there are illustrated two embodiments of that phase of my invention involving construction, one embodiment having the advantage of simplicity of construction at minimum capital cost, the other embodying certain details of construction which add somewhat to capital expenditure but which may be considered an improvement on the other embodiment in that it possesses some advantages in efficiency and economy of operation hereinafter recited. Both constructions may practice the same generic process hereinbefore described. It will be understood that these constructions are merely illustrative of my invention, the broader claims reciting the essential features of the invention and the more specific claims embodying other features of value and importance.

In the drawings—

Fig. 3 is a horizontal sectional view taken on the line 3—3 of Fig. 1.

Fig. 4 is a view on a reduced scale taken generally on the line 4—4 of Fig. 3.

Figure 1:
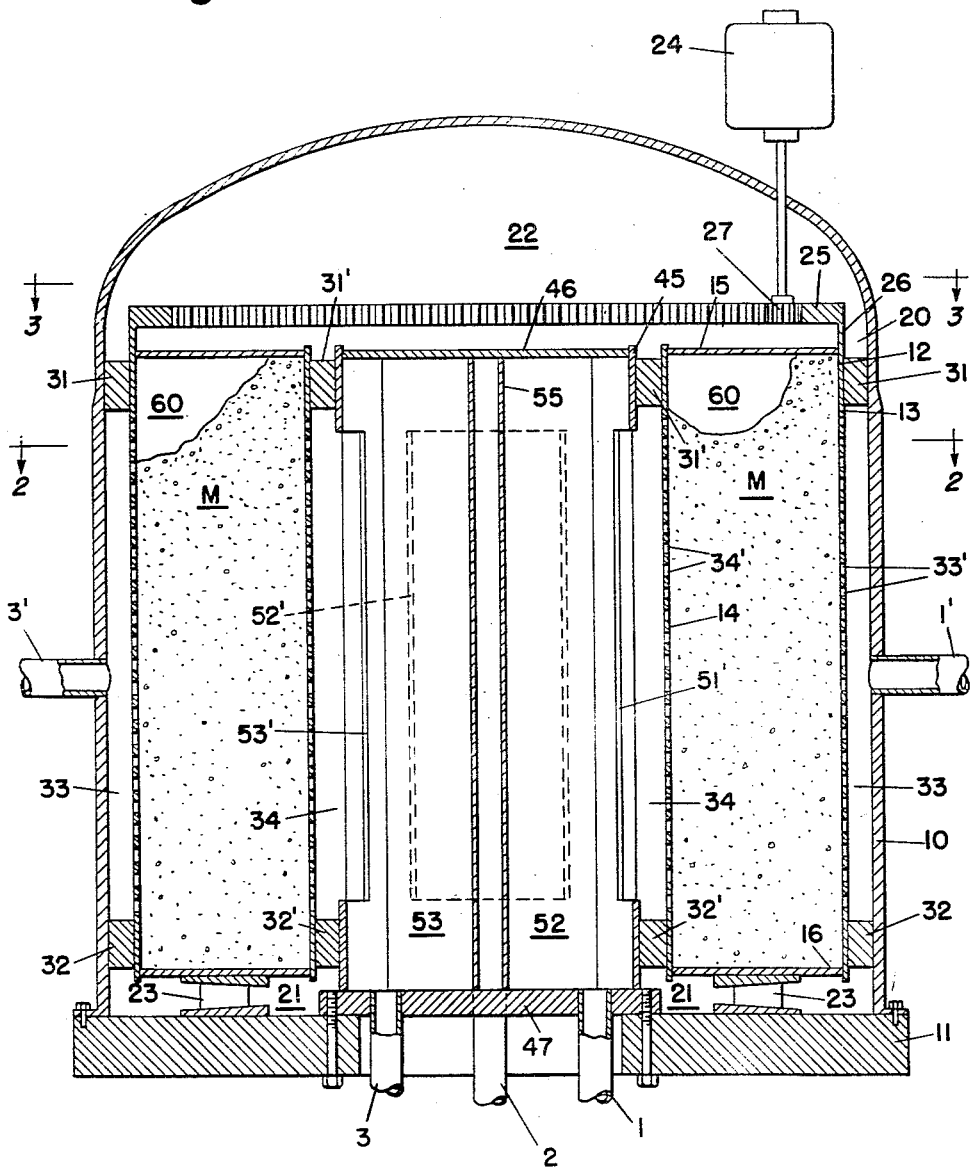
Fig. 1 is a vertical sectional view through the more simplified apparatus taken on line 1—1 of Fig. 2.

Referring now to the simplified construction shown in Figs. 1, 2, 3 and 4:

10 indicates an outer cylindrical casing which is suitably fixed, as by flanging, to a supporting head 11. The casing 10 is made pressure tight and encloses a vessel which contains the catalyst or contact material as well as the apparatus forming the fluid compartments for the supply of the different starting fluids to the vessel and the removal of different products from the vessel and also some of the elements for effecting rotation of the vessel.

The vessel 12 which contains the catalyst or contact material is annular in shape and formed by an outer cylindrical sidewall 13 and an inner cylindrical sidewall 14 which are concentric one with another and are interconnected by annular end plates 15 and 16 respectively.

The vessel 12 and associated elements form an assembly which is disposed within the casing 10 to provide an outer annular space 20, with its sidewall, a lower space 21, with the supporting head 11 and an enlarged space 22 with the upper end of the casing and with the inner sidewall 14 of the reaction vessel. A set of rollers 23 are provided within the lower space 21 to rotatably support the vessel 12 which is driven by a motor 24 suitably connected through a pinion gear 27 to a ring-gear 25, formed on extension 26, at the upper end of the reaction vessel sidewall 13.

The space 20 is divided by circumferential seals, comprising a pair of circular blocks 31 and 32 positioned in spaced relation to form therebetween an outer annular fluid zone 33 while the space 22 is similarly divided by circumferential seals comprising circular blocks 31' and 32', positioned in spaced relation to form an inner annular fluid zone 34 therebetween. The fluid zones 33 and 34 communicate with each other through apertures 33' and 34' formed in the vessel's outer and inner walls respectively, so that fluid reactants supplied to one of the zones may pass through the contact material M in the vessel 12 and the products thereof removed from the other zone.

Figure 2:
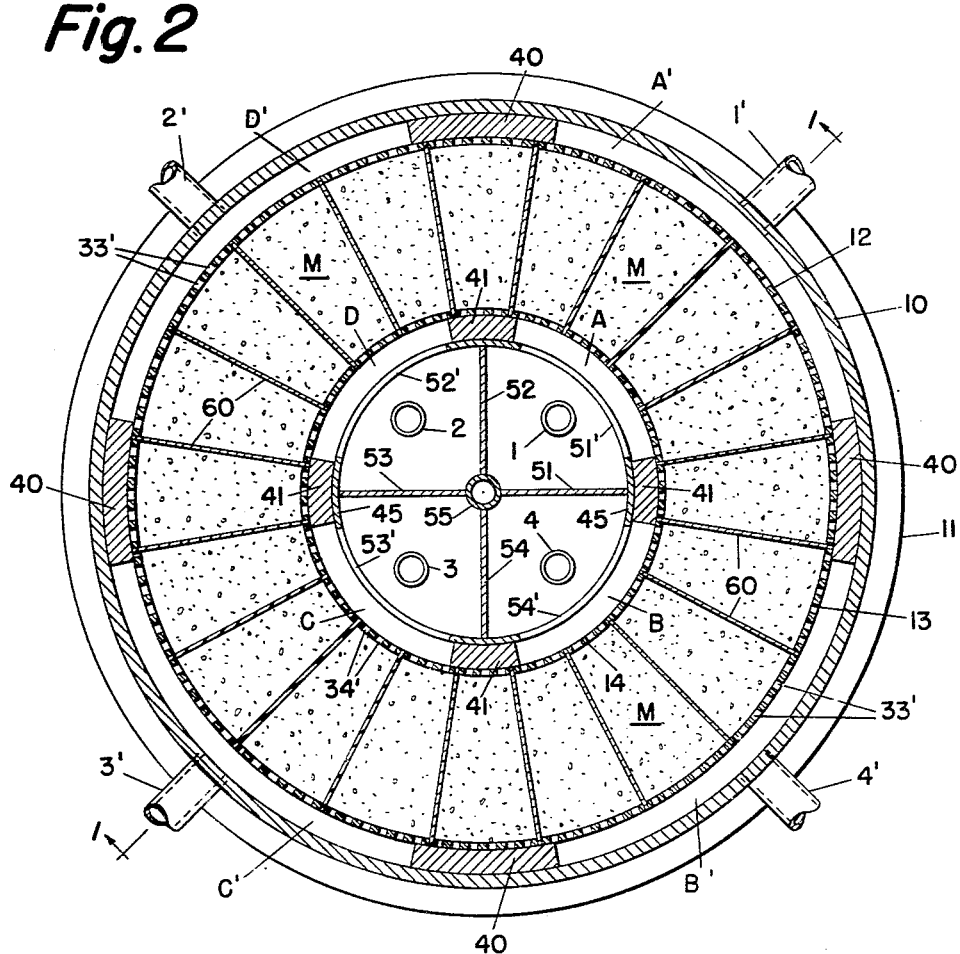
Fig. 2 is a horizontal sectional view taken on the line 2—2 of Figure 1.

In Figure 2 the outer fluid zone 33 is further divided by a plurality of vertical seals, comprising spaced elongated blocks 40, to form spaced outer arcuate compartments therein and the inner fluid zone 34 is divided by an equal number of vertical seals 41, comprising similar blocks, to form spaced inner arcuate compartments.

Since the function of the circumferential and vertical seals is to provide a set of inner fluid compartments which are separate and independent and a set of outer fluid compartments which are separate and independent, the particular construction and manner of joining the cooperating seals may be such as to effect this result and hence no specific construction of the seals is considered necessary. However, in the construction shown in Figs. 5-11, one operative seal construction is illustrated and in detail described.

An inner cylindrical casing 45 having end walls 46 and 47 is positioned within the enlarged space 22 concentrically with casing 10 and is provided with a plurality of radial partitions 51, 52, 53 and 54, shown clearly in Figure 2, which extend between the ends 46 and 47 of the inner casing and have their inner edges secured to a central post 55 and their outer edges secured to the inner wall of casing 45, dividing the casing into independent sections. Each radial partition is aligned with an inner vertical seal, as indicated, in order to divide the casing into a number of sections equal to the number of these seals. Between the adjacent partitions, openings 51', 52', 53' and 54' are provided in the casing 45 placing the sections in communication with inner compartments A, B, C and D, formed in the inner fluid zone 34, between the vertical seals 41. Inner compartments A, B, C and D will be in communication through openings 33' and 34' with the cooperating outer compartments A', B', C' and D' respectively, formed between adjacent outer vertical seals 40, thus providing pairs of inner and outer cooperating compartments A—A', B—B', C—C' and D—D' which are in communication with each other.

In Figure 2 the vessel 12 is divided by a plurality of vertical partitions 60 which extend from the upper end wall 46 to the lower end wall 47 and are suitably secured between its outer and inner walls 13 and 14 in order to form independent chambers for the catalyst or contact material M. Each of the contact material chambers are in communication with both an inner fluid compartment and its cooperating outer fluid compartment through the apertures 33' and 34', so that as the vessel is rotated, each contact material chamber will advance or rotate to be in communication in sequence with each pair of the cooperating inner and outer fluid compartments A—A', B—B', C—C' and D—D'.

Conduits indicated at 1, 2, 3 and 4 are provided, within the different sections formed in casing 45, for supplying fluids to or removing fluids from compartments A, B, C and D and cooperating conduits 1', 2', 3' and 4' are provided for supplying fluid to or removing fluid from the outer compartments A', B', C' and D'.

In order to prevent the different fluids in adjacent inner compartments from entering any one catalyst chamber at the same time the inner vertical seals will be at least as wide and preferably slightly wider than the distance between the inner edges of adjacent vertical partitions 60, and similarly the outer vertical seals will be at least as wide and preferably slightly wider than the distance between the outer edges of the adjacent vertical partitions. From an inspection of Figure 2 it will be seen that as the vessel 12 is rotated the seals 40 and 41 will cover the openings 33' and 34' between the outer and inner edges of adjacent partitions 60 so that any chamber formed between the adjacent vertical partitions can only be in communication with one pair of cooperating inner and outer fluid compartments at any one time, since the vertical seals will at all times block off the fluids in the next adjacent pair of cooperating compartments. In other words, each contact material chamber will be completely blocked off before it is advanced or rotated to be in communication with the next pair of cooperating compartments.

The circumferential and vertical seals will preferably be made stationary with the stationary inner and outer casings 45 and 10 although if desired they may be arranged to rotate with the walls of vessel 12. In order to reduce frictional contact between the relatively rotating elements of the apparatus a suitable lubricating medium may be used and also the seals may be so designed as to take into account any strains or stresses due to expansion or contraction which may be caused by temperature variations during the operation of the apparatus.

In Figure 3 the circumferential seals 31—31' are shown as single unbroken ring-like members but as heretofore mentioned they may be constructed in any desired manner suitable for effecting the sealing function. In Figure 4 an outer vertical seal 40 is shown as abutting the outer circumferential seals 31 and 32 and an inner vertical seal 41 is shown as abutting the inner circumferential seals 31' and 32', but it is to be understood that the vertical and circumferential members may be interconnected in any manner desired in order to effectively seal the fluids within the inner and outer compartments.

In Fig. 4 a more detailed view is provided to better show the relationship of the various elements. Each of the outer and inner walls 13 and 14 of the vessel 12, which contains the contact material or catalyst M, as indicated, will be provided throughout its area with apertures 33' and 34' in order to insure that the various fluids supplied to the inner or outer fluid compartments will be distributed simultaneously through all of the catalyst or contact material chambers formed by the radial partitions 60. The size of the apertures will be dependent on the size of the particles or pellets of contact material in order to insure that the material will be retained within the chamber 12 during its rotation.

The illustrated and described apparatus, although applicable generally to processes utilizing in succession a plurality of different fluids that contact with a catalyst or other contact material, such operation comprising a series of steps in sequence which are repeated indefinitely, lends itself particularly to the cracking or other treatment of petroleum hydrocarbons. For example, in the so-called "fixed bed" catalytic plants, when applied to such cracking, a stationary catalyst mass is contacted, in sequence, first with a hydrocarbon fluid to form other, and mainly, lower boiling hydrocarbons; second, with a purge medium, such as steam, to remove from the catalyst hydrocarbon material remaining therein; third, with a regenerating medium, such as air, to remove carbon deposited on the catalyst during the first step; and fourth, with a purge medium to remove regeneration products formed during the third step. The same sequence of steps characterizes my invention in its preferred use for the conversion of hydrocarbons, and no claim is made thereto; but the new mode of operation, as contrasted with the "fixed bed" and other known processes and plants hereinbefore referred to, is essentially different and may be described as follows:

Referring again to Figure 2 it will be seen that the vessel 12 is formed into a plurality of catalyst chambers comprising a unit. From the unit a plurality of different groups of the chamber are selected and each group is contacted simultaneously with the above-mentioned fluids which will be distributed radially across the chambers of each group from either the inner or outer set of compartments. Consider the fluids to be supplied to the inner set of compartments: the oil vapors are supplied to compartment A for passage through the group of contact material chambers located between compartments A—A'; the first purge fluid is supplied to compartment B for passage through the group of chambers located between compartments B—B'; the regeneration fluid is supplied to compartment C for passage through the group of chambers located between compartments C—C'; and the second purge fluid is supplied to compartment D for passage through the group of chambers located between compartments D—D'. Since the vessel 12 will be rotated at some predetermined rate and, for the purpose of this description, in a clockwise direction, the chambers of each group will successively advance until the contact material in each chamber has been contacted with each of the different fluids and then a new cycle of operation will begin.

The circumferential spacing of the sets of inner and the sets of outer vertical seals 41 and 42 respectively will determine the relative length of time in which a group of contact material chambers will be contacted by the various fluids involved in the process, since the distance between adjacent inner and adjacent outer vertical seals will determine the size of the inner and outer fluid compartments. The width of the contact material chambers, formed between adjacent partitions, will be determined in accordance with the width of the vertical seals since the vertical seals must be sufficiently wide to block off the entry of fluid into each contact material chamber from each of the inner and outer fluid compartments as a chamber moves from communication with one fluid to communication with the next fluid. For the most efficient use of the contact material the vessel 12 should be divided into numerous chambers so that only a small fraction of the total number of chambers will be blocked off by the vertical seals during rotation of the vessel. The inner vertical seals function, in effect, to interrupt the flow of reactants to the contact material chambers during rotation of the vessel as the chambers move out of communication with one fluid to be in communication with the next fluid.

Although in Figure 2 the vertical seals are shown as equally spaced, it is to be understood that they may be spaced in accordance with the length of time it is desired to have the contact material chambers contacted by each of the different fluids. For example, in the cracking operation above-described a five minute cycle may be used, wherein the contact material in each chamber may be contacted by the hydrocarbon vapors for one minute and contacted for one minute for each of the purging steps, while two minutes may be allowed for contacting the regeneration fluid. Each set of four inner and outer vertical seals would then be aligned radially to accomplish this time cycle of operation.

The embodiment of the invention disclosed in Figs. 5 to 11, inclusive, has certain pronounced advantages over the embodiment disclosed in Figs. 1 to 4, inclusive, which will be set forth in the course of the following description. While the cost of construction exceeds the cost of construction of the simplified plant shown in Figs. 1 to 4, inclusive, what has been said hereinbefore as to the high yield relative to capital cost applies also to the construction shown in Figs. 5 to 11, inclusive, as does also what has been said regarding high yield relative to the amount of catalyst and to the use of the catalyst only in its state of highest activity.

Figure 5:
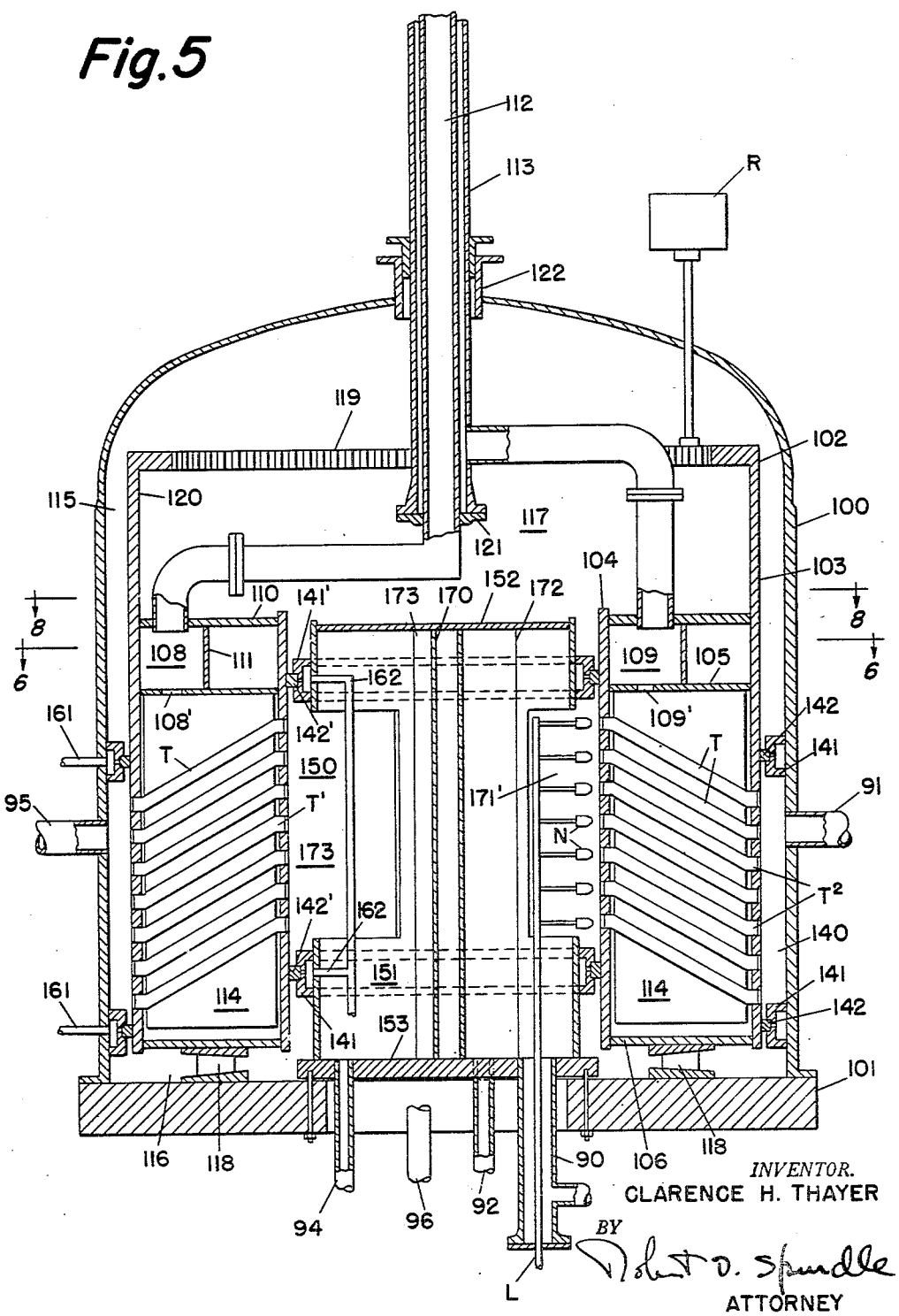
Fig. 5 is a vertical sectional view through the second apparatus hereinbefore mentioned, taken on the line 5—5 of Fig. 6.

Referring to Fig. 5, 100 indicates a cylindrical casing which is suitably fixed, as by flanging, to a supporting head 101. The casing 100 is made pressure tight and encloses the reaction vessel for containing the catalyst or contact material, the apparatus forming the fluid manifolds for the supply of reactants and purging fluid to and the removal of products from the reaction vessel as well as the various elements forming the heat exchange fluid supply and removal apparatus.

The reaction vessel, indicated generally at 102, is annular in shape and formed by an outer cylindrical sidewall 103 and an inner cylindrical sidewall 104 which are interconnected by upper and lower annular plates 105 and 106 respectively.

Figure 7:
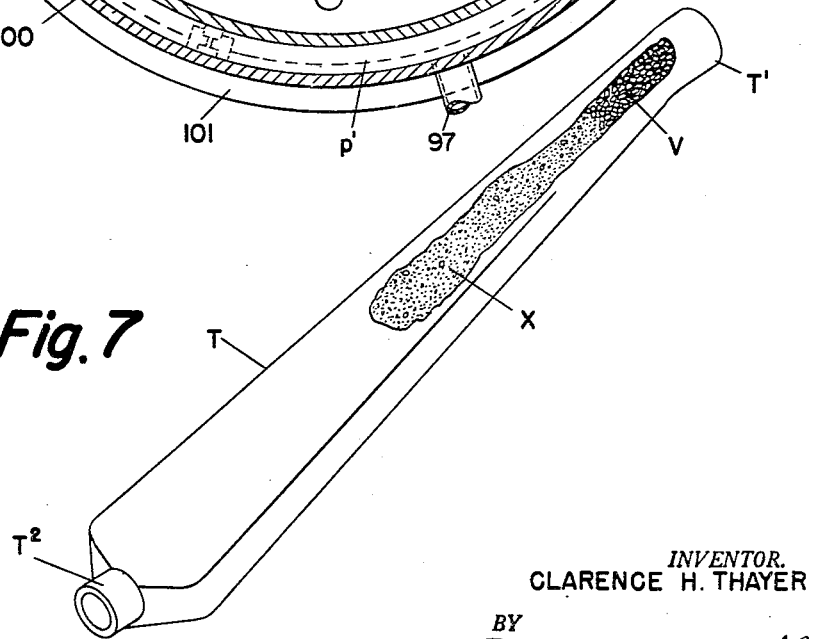
Fig. 7 is an enlarged view in perspective of one of the tubular catalyst members, with a portion removed to show the interior.

The vessel 102 is provided with a multiplicity of vertically disposed and similarly shaped tubular members T arranged in a number of tiers, one above another, and in which each tier comprises a multiplicity of such tubular members extending throughout the circumference of the reaction vessel. The tubular members extend radially thereacross and are secured in apertures in the sidewalls 103 and 104. One of the tubular members T is shown in Figure 7 and its features will be discussed later in detail. The tubular members contain catalyst of a type and activity which is suitable for the desired hydrocarbon reaction.

Figure 8:
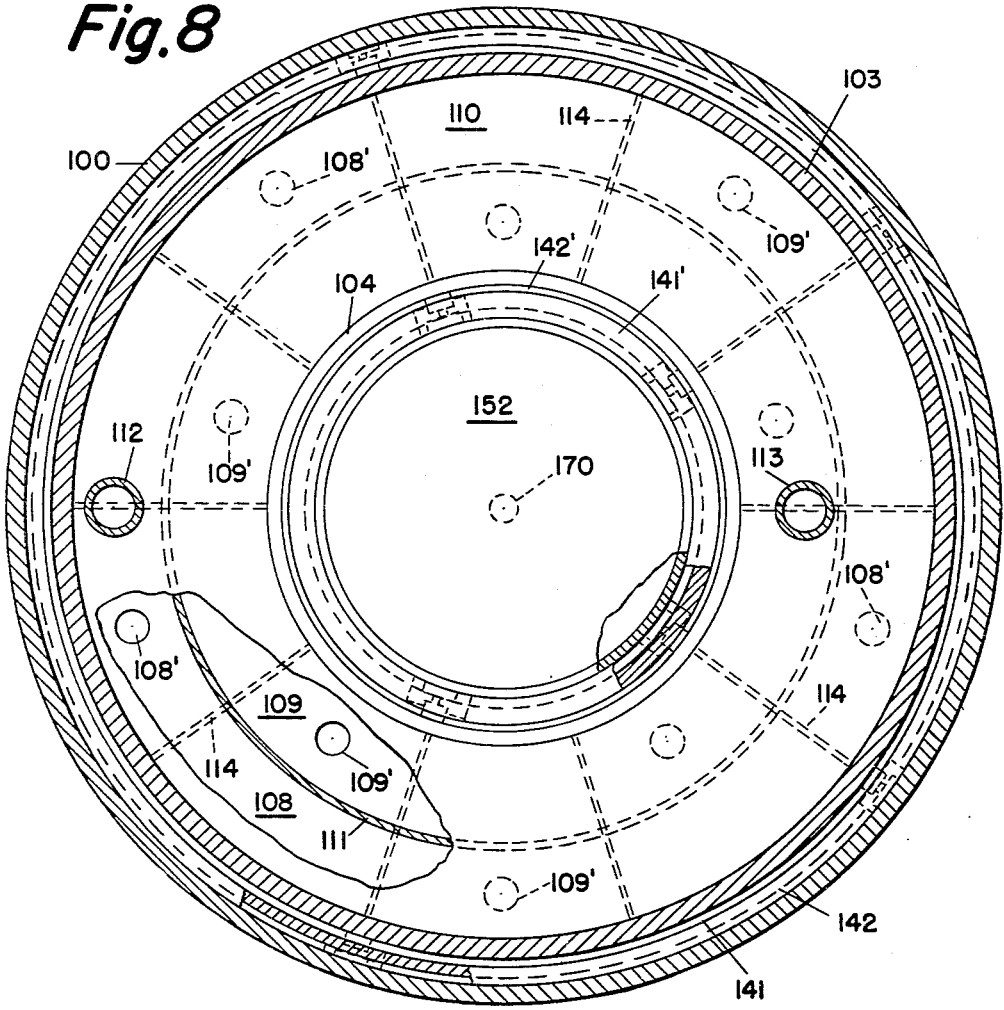
Fig. 8 is an enlarged horizontal sectional view on the line 8—8 of Fig. 5, with portions removed to show details.

The proper temperature within the reaction vessel is maintained by distributing a heat exchange medium over the tubular members from an outer heat exchange fluid supply manifold 108 to an inner heat exchange fluid removal manifold 109 both of which are provided in a space above the reaction vessel formed by a top annular plate 110 and a vertical partition 111. The heat exchange fluid is supplied from a source, for example, by inlet conduit 112, to the inlet manifold 108 and passes therefrom through openings 108' over the tubular members T, then through openings 109' to outlet manifold 109 and is removed by outlet conduit 113. Vertical baffles 114 are provided and as shown in Figure 8 are positioned within the reaction vessel 102 between the inlets 108' and outlets 109' and as shown in Figure 5 are spaced from the lower end 106 of the vessel 102 to provide for circulation of the heat exchange fluid around the tubular members T.

The reaction vessel 102 and associated heat exchange fluid circulating system form an assembly which is disposed within the casing 100 to provide an outer annular space 115, with the outer sidewall 103 of the reaction vessel, a lower space 116, with the supporting head 101 and an enlarged space 117 with the upper end of the casing and with the inner side wall 104 of the reaction vessel. A set of rollers 118 is provided within the lower space 116 to rotatably support the assembly which is driven by a motor R suitably connected to a ring-gear 119 formed on extension 120, at the upper end of the reaction vessel sidewall 103. The inner conduit 112 is connected to the lower end of outer conduit 113 by a flange 121 and both members are arranged for rotation with the assembly in a stuffing box 122 extending through the upper end of casing 100.

Referring to Figure 5: The space 115 is divided by circumferential seals or sealing members comprising elements 141 and 142 positioned above and below the outer ends $T^2$ of the tubular members T to form an outer annular fluid zone 140 therebetween, while the space 117 is divided by similar circumferential seals or sealing members comprising elements 141' and 142', positioned above and below the inner ends $T^1$ of the tubular members to form an inner annular fluid zone 150 therebetween. The fluid zones 140 and 150 communicate with each other through the tubular members T so that fluid reactants and purging fluids supplied to one of the zones will flow therefrom into the tubular members while products will be received in the other zone.

Figure 6:
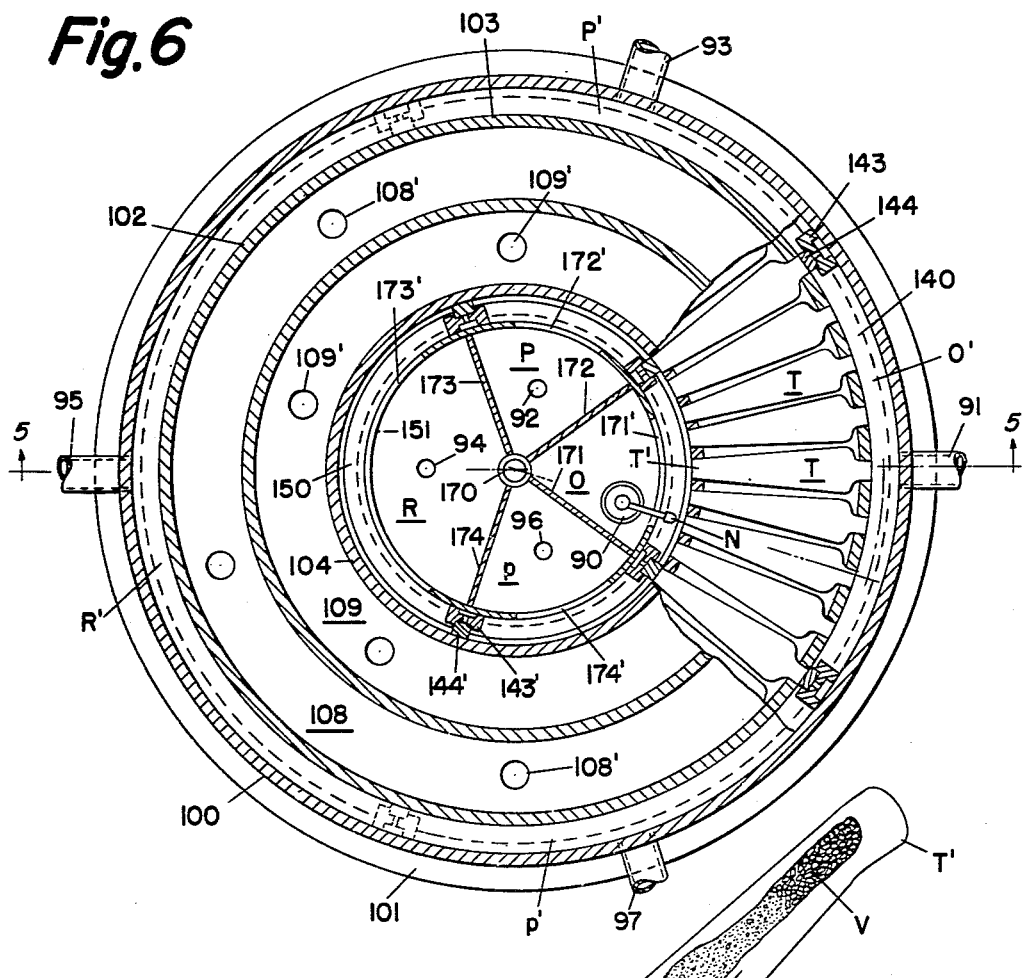
Fig. 6 is a horizontal sectional view taken on the line 6—6 of Fig. 5.

Referring to Figure 6: The outer fluid zone 140 is further divided by a plurality of vertical seals, comprising elements 143 and 144 to form outer manifolds for the outer ends of the tubular members, which manifolds are located between adjacent outer vertical seals; while the inner fluid zone 150 is divided by similar vertical seals 143' and 144' to form inner manifolds for the inner ends of the tubular members, which manifolds are located between adjacent inner vertical seals. The elements forming the circumferential and vertical seals are designed to be relatively movable by a motivating force, such as a fluid medium, as hereinafter described, in order to effect a seal with the inner walls 103 and 104 of the rotatable vessel 102. Additionally the motivating fluid, for example, steam at relatively high pressure, may function as a blocking medium in that it may enter into the manifolds located at either side of the vertical seals and, being inert, will have no deleterious effect on the reaction fluids or products within the manifolds and thus prevent the fluids from leaving the manifolds.

Figure 9:
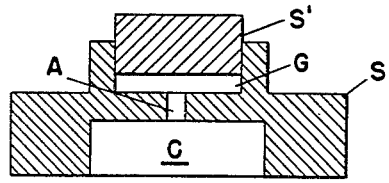
Fig. 9 is an enlarged sectional view of one of the seals to show details which are common to all the seals.

The elements forming both the circumferential and vertical seals are generally similar in design and reference may be had to Figure 9 for a detailed understanding of their structure. The element S of this figure will be representative of elements 141, 141', 143 and 143' in Figures 5 and 6 and since they are secured to the stationary casings 100 and 151 will be referred to as fixed elements while the element S' of this figure will be representative of elements 142, 142', 144 and 144' of Figures 5 and 6, which will be referred to as the movable elements. Each stationary element of the seals is provided with an annular channel C to which is supplied the motivating fluid and in its opposite face is provided with another channel G which receives the movable element S' and functions as a guideway for the movable element. Each channel C is in communication through apertures A with the channel G in order that fluid supplied to channel C will move the member S' toward the walls of the rotatable catalyst vessel 102. Each movable member S' is in effect a valve element and the walls 103 and 104 of the vessel 102 function as cooperating valve seats since the elements S' are urged to seating position with the walls and provide a seal therewith. If there should be any leakage between the movable members and the vessel walls any leakage of the inert fluid into the adjacent manifolds will block the passage of other fluids between adjacent manifolds.

Figure 10:
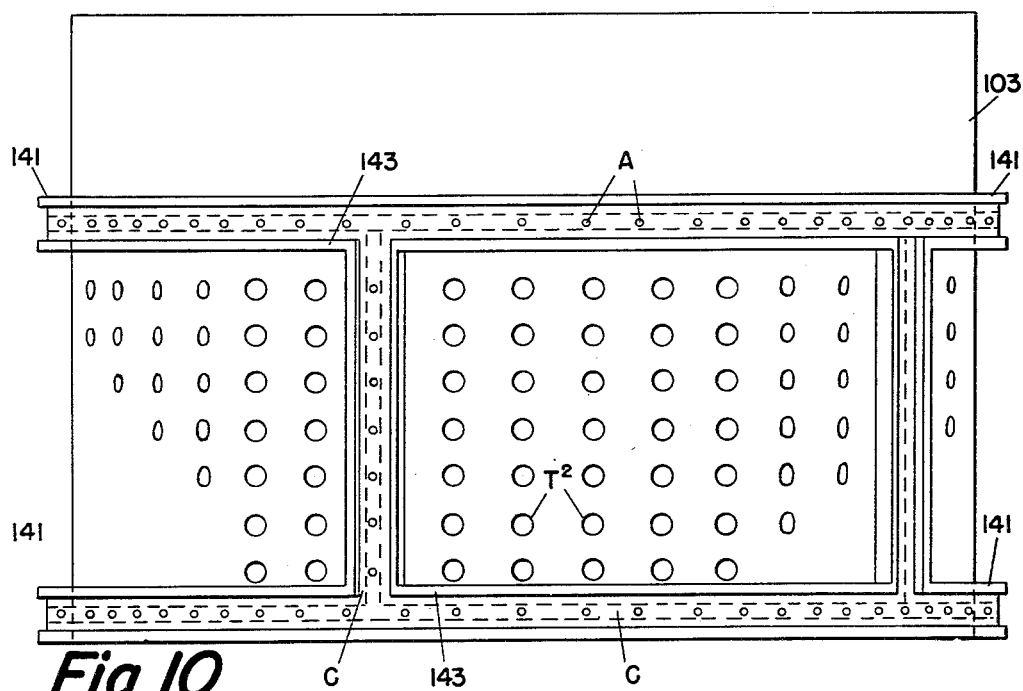
Fig. 10 is a view in elevation showing a portion of the outer sealing unit.
Figure 11:
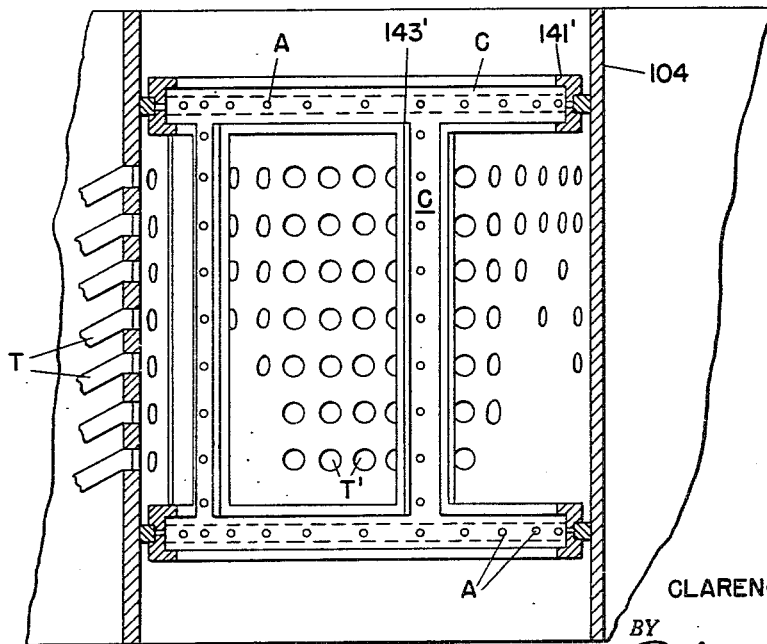
Fig. 11 is a view in elevation showing a portion of the inner sealing unit.

The circumferential and vertical seals in space 115 are so associated as to form an independent outer sealing unit and the circumferential and vertical seals in space 117 form an independent inner sealing unit. Figures 10 and 11 show the arrangements for forming the outer and inner sealing units respectively. In Figure 10 the circumferential sealing elements 141 are joined to the vertical sealing elements 143 so that their channels C are in communication; and in Figure 11 the circumferential sealing elements 141' are joined to the vertical sealing elements 143' so that their channels C are in communication. It will be understood that these views show only a portion of the outer and inner sealing units and that both the circumferential and vertical channels of each unit will be in communication through each channel of the vertical seals so that the sealing or motivating fluid may be supplied to any channel of each unit and will pass through all the channels of the unit.

In Figure 5 is shown an arrangement for simultaneously effecting the seals of both the inner and outer units with the rotatable walls 103 and 104 of the reaction vessel by supplying the motivating or forcing fluid, preferably steam, to the inner and outer sealing units. The fluid may be supplied to the outer sealing units by one or more conduits 161 directly against the movable elements and at sufficient pressure to urge the various movable elements of the unit toward the wall 103 of the vessel 102, while the fluid may be supplied to the inner sealing unit by one or more conduits 162 directly against the movable element.

Referring again to Figures 5 and 6, an inner casing 151 is provided with top and bottom end walls 152 and 153 and is divided by radial partitions 171, 172, 173 and 174 which extend between the upper end 152 and lower end 153 of the casing and have their inner edges secured to a central post 170 and their outer edges secured to the inner wall of the casing 151 dividing the casing into independent chambers. Each radial partition is aligned with an inner and an outer vertical seal and between adjacent partition openings 171', 172', 173' and 174' are provided in the casing 151 placing the chambers in communication with the inner ends T¹ of the tubular members T. Each inner chamber formed between adjacent inner vertical seals and partitions will be in communication through the tubular members T with a cooperating outer manifold formed between adjacent outer vertical seals.

The pairs of inner and outer cooperating chambers and manifolds are indicated respectively as O—O', P—P', R—R' and p—p' to identify each cooperating pair by the various fluids which are involved in effecting a catalytic hydrocarbon reaction as explained below.

O=oil charge  O'=oil products
P=first purge medium  P'=purge products
R=regeneration medium  R'=regeneration products
p=second purge medium  p'=second purge products The various fluids are supplied simultaneously to the respective inner chambers O, P, R and p and the products removed simultaneously from the outer manifolds O', P', R' and p' following the reaction which takes place in the tubular members T.

Since the reaction chamber 102 progressively increases in cross-sectional area between the inner fluid zone 150 and the outer fluid zone 140 the tubular members are designed with diverging sidewalls as shown in Figure 7, to progressively increase in cross-sectional area between their inner ends T' and their outer ends T² in order to contain progressively increasing volumes of catalyst or contact material between their inner and outer ends. The vertical seals will be sufficiently wide to cover the inlet and outlet ends of the tubular members as they are rotated from one chamber or manifold to an adjacent chamber or manifold.

By way of explaining the utility of the invention, consider the hydrocarbon material to be a cracking charge supplied by conduit 90 in vapor form to the inner chamber O from which it will pass into the inner ends T' of the tubular members T located between the inner vertical seals, which are aligned with partitions 171 and 172, in contact with the catalyst therein and the products from the reaction will enter outer manifold O', formed between the outer vertical seals which are aligned with partitions 171 and 172, from the tubular members which have their outer ends T² located between the outer vertical seals and removed by conduit 91. It will be understood that all of the tubular members T will rotate counterclockwise and continuously with vessel 102 at a predetermined rate and that each vertical row of tubular members will advance to be sequentially in communication with chambers O, P, R and p and O', P', R' and p'. The first purging medium will be supplied to chamber P through conduit 92 and the purge products after passage through the tubular members will be removed from manifold P' by conduit 93. The regeneration medium is supplied to chamber R by conduit 94 and the regeneration products removed from manifold R' by conduit 95, while the second purge medium is supplied to chamber p by conduit 96 and the second purge products removed from manifold p' by conduit 97.

The particular design of catalyst tube T lends itself particularly to the on-stream hydrocarbon reaction since only a relatively small volume of catalyst need be used with the fresh oil vapor charge and as the charge continues to pass through the tubular members it becomes increasingly more refractory, but it will contact progressively increasing volumes of catalyst which results in a more controlled and even reaction.

An important feature of the invention is in providing for the periodic jetting of a higher boiling liquid or mixed liquid and vapor directly into the inlet ends T' of the tubular members along with the principal lower boiling oil vapor charge from chamber O. This arrangement is shown in detail in Figure 5 wherein a conduit L having a vertical row of nozzles N manifolded thereto is located within chamber O to have the nozzle inner ends positioned adjacent the inner wall of the reaction vessel in order to intermittently or periodically jet, in timed relation with the rate of rotation of the reaction vessel 102, the liquid oil or oil mixture directly into the inner ends of the tubular members. The inner ends of the tubular members will contain a vaporizing contact material, or a catalyst of low activity, indicated at V in Figure 7 in order to supply the heat necessary to vaporize the oil or oil mixture and place the jetted material in vaporous state before it reaches the more active cracking catalyst indicated at X. The volume of vaporizing contact material V will be from 5–30% of the total volume of the tubular members T and will vary in accordance with the degree of refractoriness of the liquid oil or mixture which is jetted into the tubular members. The percentage of liquid oil or mixture jetted into the tubular members will range from 10 to 40 per cent. of the total oil charge supplied to the tubular members during the cracking operation, depending upon the degree of refractoriness of the liquid oil or mixture. It is to be understood that the steps of jetting higher boiling or more refractory liquid oil or mixture directly into the vaporizing zone of the tubular members provides an arrangement for greater through-put of oil charge during the cracking operation and hence a greater or more economical utilization of the cracking catalyst.

While the catalyst compartments or containers in both embodiments of the invention are described as extending "radially," it will be understood that it is not intended by this term to exclude some angular deviation from a precise radial line extending laterally through the centers of the compartments or containers; that is, if the compartments or containers were somewhat inclined to a precise radial direction; the term "radial" extension being intended to exclude the flow of the reactants in a direction parallel, or nearly so, to the axis of rotation of the annular revoluble catalyst chamber, which would involve structural complications and would not accomplish the objects of the invention. In my invention there is no bar to making the height of the annular catalyst chamber greatly exceed its radial width, as shown in both embodiments of the invention, and particularly in the embodiment shown in Figures 1–4, in order to secure a higher product yield, one object of the invention being to provide the shortest length of flow through the individual compartments of containers consistent with maximum catalyst efficiency and yield. This could not be achieved if the direction of flow were parallel, or nearly so, to its axis of rotation, since the length of flow would be unnecessarily long, the catalyst would not function with maximum efficiency, and the product yield relative to the volume of catalyst would be greatly reduced. While it would be possible to avoid some of the objections incident to flowing the entering fluids in the general direction of the axis of rotation by substantially reducing the height and substantially increasing the diameter of the annular catalyst chamber, such increase in the diameter of the converter would be so great as to be impracticable and mechanical complications would not be avoidable. In my invention there is no minimum limit to the length of the flow paths consistent with maximum efficiency and the vertical height of the annular catalyst chamber may be increased to any reasonable height without substantial change in the proportion of yield relative to catalyst volume.

It will be understood that the width of the several individual catalyst compartments or containers should be so limited that their number shall be multiple times the number of the fixed inner arcuate sections from which fluids are fed to the catalyst units and the corresponding number of fixed outer arcuate sections into which the products flow. Thus, in Fig. 2, the number of catalyst units to fixed inflow or outflow arcuate sections is in the ratio of five to one, while in Fig. 6 this ratio is substantially greater. It will, of course, be understood that it is not essential that the number of catalyst units shall be an integer multiple of the number of fixed arcuate sections. Thus, while the apparatus of Figure 2 is illustrated as having twenty catalyst units and four such arcuate sections so that the ratio is exactly five to one, the apparatus could be constructed instead with, for example, nineteen or twenty-one catalyst units.

Another advantage arising from flowing the hydrocarbon reactant through the shortest possible catalyst path and for the shortest length of time consistent with maximum conversion is that the deposit of carbon incident to such conversion contact is reduced to a minimum. Regeneration of the catalyst requires in commercial processes considerable rise in temperature for a relatively long time, which shortens the life of the catalyst. It will be clear that the temperature required, or the length to which the catalyst is subjected to high temperature, in the regeneration step of my process is reduced to a minimum, thus prolonging the life of the catalyst.

The capacity of the plant to handle liquid feed is of importance. Certain features of the invention have been found of great value in attaining or insuring this capacity. Thus the downward inclination, from entrance to exit, of the tubular units makes it possible to utilize a granular relatively inert mass for the vaporization of the liquid.

This application is a continuation-in-part and consolidation of applications Serial Number 295,754 and Serial Number 295,755, filed June 26, 1952, both now abandoned.

I claim:

1. Process of catalytic conversion in which fluid organic reactants are converted to organic products by contact with a catalyst and alternately with which the catalyst by contact with other fluids is regenerated for contact with later supplies of organic reactants; the same comprising revolving an annular catalytic mass divided into a multiplicity of radially extending sections multiple times in number the number of fluids, continuously flowing, as the revolution of the mass proceeds, the several fluids outward from central spaces into fixed aligning arcuate spaces corresponding in number to the fluids and sealed one from another and surrounding the central space and surrounded by the revoluble catalytic mass, and as the revolution of the catalytic mass continues, continuously flowing the several fluids from the several sealed arcuate spaces outward through successive fractions of the mass into arcuate spaces paired with the first-named arcuate spaces and surrounding the revoluble catalytic mass, and separately removing the fluid products of the several fluid contacting operations from the last named arcuate spaces.

2. Process of catalytic conversion as defined in claim 1 in which the several fluids in their flow through the several sections contact during successive time intervals with progressively increasing volumes of catalyst.

3. Process of catalytic conversion as defined in claim 1 in which the fluid flow from an inner fixed arcuate space to an outer paired fixed arcuate space is through radial sections spaced apart both circumferentially and vertically.

4. Process of catalytic conversion as defined in claim 1 in which in the flow of fluid radially from an inner fixed arcuate space to an outer fixed arcuate space is successively through catalyst of relatively low and catalyst of relatively high activity.

5. A converter in which different fluids are passed successively through contact material and from which the effluent products are successively removed, the same comprising a fixed outer cylindrical casing, a fixed inner cylindrical casing, an annular revoluble reaction vessel between the inner and outer casings and spaced from both to form inner and outer circumferential spaces, partitions in the inner casing dividing its interior into sections, vertically and circumferentially extending inner and outer seals between the annular revoluble vessel and the inner and outer casing, the inner seals dividing the inner circumferential space into inner independent arcuate spaces communicating with the respective sections, the outer seals dividing the outer circumferential space into independent arcuate spaces paired with the inner independent arcuate spaces and having separate outlets, and a multitude of radially extending compartments formed in the reaction vessel and adapted to contain contact material, said compartments having inner inlets and outer outlets which, in the rotation of the reaction vessel, afford radial communication between successive pairs of inner and outer arcuate spaces.

6. A converter as defined in claim 5 further characterized by the inner vertically extending seals being of such width as to block, during rotation of the annular revoluble vessel, communication between any reaction vessel compartment and more than one inner arcuate space and the outer vertically extending seals being of such width as to block, during rotation of the annular revoluble vessel, communication between any reaction vessel compartment and more than one outer arcuate space.

7. A converter as defined in claim 5 in which the inner and outer vertical seals are in radial alignment and in which the inner vertical seals are of a width, measured arcuately, adapted to overlap the inlet means to each radially extending compartment in its circumferential travel and in which the outer vertical seals are of greater width, measured arcuately, than the inner vertical seals and adapted to overlap the outlet means from each radially extending compartment in its circumferential travel.

8. Apparatus for use involving a mass of contact material which comprises an outer stationary cylindrical casing with end walls forming an outer chamber, an inner stationary cylindrical casing providing a space with the outer cylindrical casing and having end walls forming an inner chamber, a rotatable vessel within said space having concentric inner and outer walls, the inner wall of the vessel forming an inner fluid zone with said inner stationary casing and the outer wall of the vessel forming an outer fluid zone with said outer stationary casing, a pair of spaced circumferential seals within each of said inner and outer fluid zones, a plurality of spaced elongate seals disposed within each of the inner and outer fluid zones and dividing the inner fluid zone into a set of independent inner fluid compartments and the outer fluid zone into a set of independent outer fluid compartments, the elongate seals in the two fluid zones being equal in number and each inner elongate seal being paired with an outer elongate seal in order to provide a plurality of pairs of cooperating inner and outer fluid compartments, partitioning means between the inner and outer walls of the vessel dividing it into a multiplicity of independent contact material chambers, each of said chambers being in communication through openings in the inner and outer walls of the vessel respectively with a pair of cooperating inner and outer fluid compartments and during rotation of the vessel each of the contact material chambers being in communication in sequence with each pair of cooperating inner and outer fluid compartments, means for supplying fluids simultaneously to each of the fluid compartments of one set for successive passage across the contact material chambers and means for removing the reaction products simultaneously from each of the fluid compartments of the other set.

9. Apparatus for use involving a mass of contact material which comprises an outer vertically disposed stationary cylindrical casing with upper and lower end walls forming an outer chamber, an inner stationary cylindrical casing concentric with and providing a space with the outer cylindrical casing and having upper and lower end walls forming an inner chamber, a rotatable vessel within said space having concentric inner and outer vertical walls, the inner wall of the vessel forming an inner fluid zone with said inner stationary casing and the outer wall of the vessel forming an outer fluid zone with said outer stationary casing, a pair of spaced circumferential seals within each of said inner and outer fluid zones, a plurality of spaced vertical seals disposed within each of the inner and outer fluid zones and dividing the inner fluid zone into a set of independent inner fluid compartments and the outer fluid zone into a set of independent outer fluid compartments, the vertical seals in the two fluid zones being equal in number and each inner vertical seal being paired with an outer vertical seal in order to provide a plurality of pairs of cooperating inner and outer fluid compartments, partitioning means having their inner edges secured to the inner wall of the vessel and their outer edges secured to the outer wall of the vessel dividing the vessel into a multiplicity of independent contact material chambers, each of said chambers being in communication through the inner and outer walls of the vessel respectively with a pair of cooperating inner and outer fluid compartments and during rotation of the vessel each of the contact material chambers being in communication in sequence with each pair of cooperating inner and outer fluid compartments, means for supplying fluids simultaneously to each of the fluid compartments of one set for passage across the contact material chambers and means for removing the reaction products simultaneously from each of the fluid compartments of the other set.

10. Apparatus as in claim 9, further characterized by the circumferential and vertical seals being secured in fixed position between the rotatable vessel and the stationary casings.

11. Apparatus as in claim 9, further characterized by the circumferential seals being in the form of ring-like elements and the vertical seals being positioned between and in tight fitting relation with the ring-like elements.

12. Apparatus as in claim 9, further characterized by the vertical seals forming the set of inner compartments being at least as wide as the inner end openings of the independent contact material chambers and the vertical seals forming the outer compartments being at least as wide as the outer end openings of the individual contact material chambers.

13. Apparatus as in claim 8, further characterized by the vessel having power means connected thereto for effecting its rotation.

14. Apparatus as in claim 8, further characterized by power means positioned exteriorly of the outer casing and connections therefrom to the vessel to effect its rotation.

15. A converter in accordance with claim 5 in which the radially extending compartments in the rotatable reaction vessel comprise a multiplicity of separate tubular members, adapted to contain contact material, communicating at opposite ends with the stationary inner and outer circumferential spaces, each tubular member having diverging walls effecting progressive increase in cross-sectional area, whereby the fluid charge progressing therethrough, becoming increasingly more refractory, will contact with progressively increasing volumes of catalyst.

16. A converter in accordance with claim 5 in which the radially extending compartments in the revoluble reaction vessel comprise separate tubular members arranged in a number of tiers one above another, and in which each tier comprises a multiplicity of tubular members extending throughout the circumference of the reaction vessel, so that in the rotation of the reaction vessel the charging fluid is split into a number of separate streams at different circumferential positions and at different vertical heights each contacting with a catalyst body of minimum volume to thereby insure the most effective utilization of the catalyst.

17. A converter in accordance with claim 5 in which the radially extending compartments in the reaction vessel comprise a multiplicity of separate tubular members, adapted to contain contact material, communicating at opposite ends with the stationary inner and outer circumferential spaces, the tubular members, in their outward direction of extension from the inner to the outer stationary circumferential spaces, being inclined in a downward direction.

18. A converter in accordance with claim 5 in which the sealing means therein specified between the wall of the stationary casing and the wall of the annular revoluble vessel comprise a member fixed to the casing wall and having a channel therein and another member movable in said channel and facing a wall of the rotatable vessel, and means urging the movable member into slidable contact with the wall of the revoluble reaction vessel.

19. A converter in accordance with claim 18 in which the circumferential and vertical seals are similar in design, in which the channels of the circumferentially extending members fixed to each casing wall are in fluid communication with the channels of the vertically extending members fixed to the same casing wall, and in which the movable members in said intercommunicating channels are interconnected, and means adapted to supply a pressure fluid to the channels of said fixed members and thereby maintain said movable members in sliding contact with the opposing wall of the rotatable reaction vessel.

20. A converter in accordance with claim 5 in which each radially extending compartment of the rotatable annular vessel contains near its inner end contact material of relatively low catalytic activity adapted to provide surface for vaporization of any liquid constituent of reactant fluid introduced and which beyond said inner end portion contains contact material of relatively high catalytic activity.

21. A converter in accordance with claim 5 in which the radially extending compartments in the reaction vessel comprise a multiplicity of separate tubular members, adapted to contain catalyst, communicating at opposite ends with the stationary inner and outer circumferential spaces, and liquid conveying means extending into one of the inner independent arcuate spaces and having discharge openings through which such liquid is adapted to be introduced into the inner ends of the tubular members.

References Cited in the file of this patent

UNITED STATES PATENTS

| | | |
|---|---|---|
| 2,304,398 | Campbell | Dec. 8, 1942 |
| 2,334,555 | Howard | Nov. 16, 1943 |
| 2,347,829 | Karlsson | May 2, 1944 |
| 2,355,024 | Yerrick et al. | Aug. 1, 1944 |
| 2,492,407 | Tomany | Dec. 27, 1949 |